July 29, 1969  D. W. FRANCIS ET AL  3,458,567
USE OF GLYCERIN AS AN ANTIFOAM AGENT
Filed Feb. 9, 1968
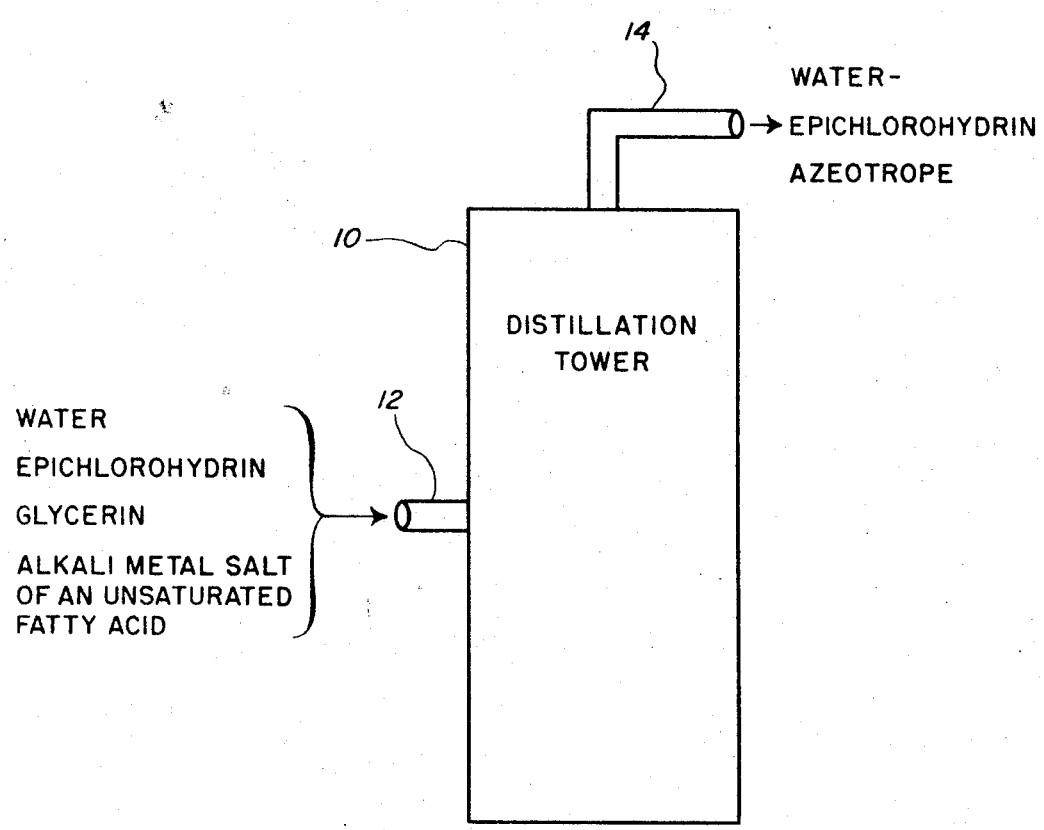
INVENTORS:
DAVID W. FRANCIS
WILLIAM J. HEILMAN

United States Patent Office 3,458,567
Patented July 29, 1969

3,458,567
USE OF GLYCERIN AS AN ANTIFOAM AGENT
David W. Francis, Verona, and William J. Heilman, Allison Park, Pa., assignors to Gulf Research & Development Company, Pittsburgh, Pa., a corporation of Delaware
Filed Feb. 9, 1968, Ser. No. 704,222
Int. Cl. C07c 51/44; B01d 3/34
U.S. Cl. 260—526                     9 Claims

ABSTRACT OF THE DISCLOSURE

In a process for the removal of water by azeotropic distillation from a mixture of water, epichlorohydrin and an alkali metal salt of an unsaturated fatty acid having between 3 and 20 carbon atoms, the improvement which comprises adding to said mixture an amount of glycerin sufficient to inhibit foaming during distillation.

---

This invention relates to an improved process for the preparation and recovery of alkali metal salts of fatty acids wherein epichlorohydrin is used as the solvent.

In the past, various methods have been proposed for the perparation of glycidyl esters of fatty acids, such as the preparation of glycidyl methacrylate. These methods generally involve the initial neutralization of the fatty acid with an alkali metal hydroxide to produce an alkali metal salt of the acid and water. In some former processes the salt is converted as formed into the glycidyl ester by reaction with epichlorohydrin present in the reaction zone together with a catalyst such as benzyltrimethylammonium bromide which promotes the ester formation reaction. Other processes separate the solid alkali metal salt as a first reaction product by filtration and charge the solid salt to a second reaction zone together with epichlorohydrin and a catalyst. These prior art processes suffer from certain disadvantages such as poor yields in the former and expensive separation and handling procedures in the latter. The poor yields in the former are caused by the loss of epichlorohydrin to unwanted by-products such as 1,3-dichloropropanol-2 and a chlorohydrin ester

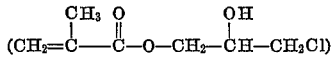

which forms by the interaction of epichlorohydrin and the fatty acid in the presence of the benzyltrimethylammonium bromide catalyst which is required for the formation of the glycidyl ester. It was discovered that many of the problems of the prior art processes could be overcome if the alkali metal salt of the fatty acid was formed in a first reaction zone using epichlorohydrin or other solvent which would azeotrope with water and removing substantially all of the water from the first reaction zone while maintaining the alkali metal salt in suspension in the solvent before the addition of the quaternary ammonium halide catalyst under anhydrous conditions.

However, it was discovered that when epichlorohydrin is used as the solvent in the formation of the alkali metal salts, the reaction mixture tends to foam severely when attempts are made to remove the water from the reaction zone by distillation of a water-epichlorohydrin azeotrope. Foaming does not occur and therefore is not a problem when solvents other than epichlorohydrin, such as benzene or 1,2-dichloropropane, are used to prepare the alkali metal salts. Foaming is also not a problem when the glycidyl esters are formed in a one-step reaction where epichlorohydrin is used as a solvent and a reactant in the presence of the quaternary ammonium halide catalyst.

Various commercially available antifoam agents were tried in an attempt to obviate this foaming problem, but without success. It has now been found that this foaming phenomenon can be completely eliminated by the relatively simple expedient of adding a small amount of glycerin to the reaction mixture.

In accordance with the invention, in a process for the removal of water by azeotropic distillation from a mixture of water, epichlorohydrin and an alkali metal salt of an unsaturated fatty acid having from 3 to 20 carbon atoms, the improvement which comprises adding to said mixture an amount of glycerin sufficient to inhibit foaming during distillation.

The figure shows a schematic drawing of a distillation tower 10 into which through line 12 comes water, epichlorohydrin, glycerin and an alkali metal salt of an unsaturated fatty acid. A water-epichlorohydrin azeotrope is removed overhead through line 14.

The fatty acids which can be used in the process of this invention comprises those unsaturated fatty acids represented by the general Formula I below:

FORMULA I

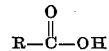

where R is an unsaturated unsubstituted alkyl radical having from 2 to 19 carbon atoms, preferably from 2 to 10 carbon atoms and most preferably from 2 to 4 carbon atoms. By an unsaturated unsubstituted alkyl radical is meant an alkyl radical or group containing only carbon and hydrogen and having one or two olefinic double bonds.

Examples of suitable unsaturated fatty acids coming within the above formula include acrylic; methacrylic; allyl acetic; vinyl acetic; crotonic; isocrotonic; tiglic; angelic; senecioic; hexenic acids ($C_5H_9COOH$); hypogeic acid ($C_{15}H_{29}COOH$); oleic; elaidic acid($C_{17}H_{33}COOH$); linoleic acid ($C_{18}H_{32}O_2$); palmitoleic acid ($C_{16}H_{30}O_2$); myristoleic acid ($C_{14}H_{26}O_2$) and linolenic acid $$(C_{18}H_{30}O_2)$$

The above described unsaturated fatty acids are reacted with a solution of an alkali metal hydroxide in the presence of epichlorohydrin to produce a solid alkali metal salt of said fatty acid suspended in the epichlorohydrin.

Any alkali metal hydroxide can suitably be used in the process of this invention to react with the unsaturated fatty acid to produce the salt thereof. The alkali metal hydroxide can be represented by the general Formula II below:

FORMULA II

where M represents any alkali metal selected from the group consisting of sodium, potassium, lithium and cesium. It has been found that solid dry alkali metal hydroxides do not work in the process of this invention even when ground up in fine powdered form. Apparently the solid alkali metal hydroxide is not soluble in the unsaturated fatty acid, and thus the desired reaction does not occur. It is necessary therefore to employ an aqueous solution of the alkali metal hydroxide. The amount of water necessary to form an aqueous solution is not critical, but sufficient water should be employed to keep the alkali metal hydroxide in solution. Commercially available 50 to 70 percent aqueous solutions of alkali metal hydroxides, such as sodium hydroxide and potassium hydroxide, can suitably be employed and are, of course, the most desired since they are easily obtained.

Theoretically, one mole of the alkali metal hydroxide is required per mole of the unsaturated fatty acid in order to produce one mole of the alkali metal carboxylate. For economic reasons, the molar ratio of the alkali metal to the unsaturated monocarboxylic acid should be about 1:1. It is preferably between 0.95:1 and 1.05:1 and is more preferably between 0.98:1 and 1.02:1. Higher amounts of alkali metal hydroxide, i.e. in molar ratios up to 5:1 offer little advantage, nor do amounts below a mole ratio of about 0.8:1.

The reaction between the acid and alkali metal hydroxide is a simple neutralization reaction with the formation of a salt and water in accordance with the following equation:

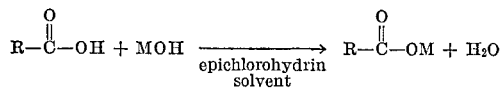

where R and M have the significance defined above. The

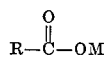

salt is a solid which precipitates and is suspended in the epichlorohydrin in a finely divided form.

The amount of epichlorohydrin to employ as a solvent should be sufficient to allow the epichlorohydrin to serve its function of maintaining the alkali metal salt of the unsaturated fatty acid in suspension before, during and after removal of the water from the reaction zone as an azeotrope with the epichlorohydrin. The molar ratio of the solvent to the unsaturated fatty acid is suitably at least 1:1 and is usually on the order of 5:1. Much greater ratios of epichlorohydrin to acid, for example on the order of 10:1 or 100:1 or greater, e.g. 1000:1 or higher, can also, of course, be employed.

The alkali metal hydroxide reacts very quickly with the unsaturated fatty acid to produce the desired alkali metal carboxylic acid salt even at low temperatures. Thus, temperatures as low as 0° C. can suitably be employed, but for economic reasons temperatures of about room temperature, i.e. between 20° C. and 40° C., are preferred. Higher reaction temperatures up to about 100° C. can also be employed but are particularly disadvantageous when the solvent employed in the preparation of the alkali metal salts is epichlorohydrin. The reason for this is that it has been found that epichlorohydrin reacts thermally with water at temperatures above about 40° C. to form chlorohydrin ethers, glycidyl ethers and with glycidyl esters to form chlorohydrin esters, and thus valuable epichlorohydrin is lost to the formation of these unwanted by-products. Thus, while the inventive feature of this invention, namely the reduction of the foaming phenomenon during distillation of a water-epichlorohydrin azeotrope, occurs regardless of reaction temperature, it is preferred that the lower temperatures be employed, such as those between 20° and 40° C., to prevent loss of epichlorohydrin to unwanted by-products.

The upper reaction temperature is limited by the boiling point of the epichlorohydrin or the epichlorohydrin-water azeotrope unless increased pressures are employed. Increased pressures can be employed if desired but show no advantage over atmospheric operation. It is noted, however, that the reaction of an alkali metal hydroxide with the unsaturated fatty acid is an exothermic reaction and care must be taken to provide suitable means, such as cooling coils, to control the temperature of the reaction to the desired level.

The reaction pressure is not critical but must be sufficient to maintain the unsaturated fatty acid and epichlorohydrin in the liquid phase during the formation of the alkali metal salt. Atmospheric pressure is generally preferred for reasons of economy, however, pressures as low as 0 p.s.i.g. or as high as 100 p.s.i.g. can be employed.

The manner of admixing the unsaturated fatty acid, alkali metal hydroxide and epichlorohydrin is not critical.

Usually the epichlorohydrin and acid are admixed and the alkali metal hydroxide solution is added dropwise continuously through the course of the reaction or in incremental portions or slugs during the reaction. The addition of all of the alkali metal hydroxide initially is not preferred because of the development of a high heat of reaction and solution which, as noted above, is difficult to control, especially since it is preferred to maintain the reaction temperature below 40° C.

The reaction time is not critical but will vary somewhat depending on the exact temperature employed. Reaction is very fast, however, even at the low temperatures of 0° C. and reaction times are generally on the order of 1 to 60 minutes and are more usually from 5 to 15 minutes. If desired a polymerization inhibitor such as an amine, substituted phenol etc. can be added to the reaction mixture to inhibit the polymerization of the acid. Sufficient mixing should be provided to insure adequate and uniform temperature control and contacting of the reactants throughout the reaction zone.

After the formation of the desired alkali metal acid salt it is sometimes desirable to recover the alkali metal salt in a substantially anhydrous form while still suspended in the epichlorohydrin. The recovery of such an anhydrous slurry is desirable, for example, when the alkali metal salt is to be converted in a second stage by reaction with epichlorohydrin in the presence of a quaternary ammonium halide catalyst to produce a glycidyl ester of the starting fatty acid. In this case the water of reaction and the water added with the alkali metal hydroxide is removed as a water-epichlorohydrin azeotrope. It has been found that severe foaming occurs when attempts are made to recover this water-epichlorohydrin azeotrope. It has been found quite unexpectedly that the addition of a small amount of glycerin to a mixture comprising water, epichlorohydrin and an alkali metal salt of an unsaturated fatty acid will substantially eliminate the foaming phenomenon during distillation to remove a water-epichlorohydrin azeotrope.

The amount of glycerin to add is very small, amounts as low as 10 p.p.m. being satisfactory. Amounts of glycerin greater than about 1 weight percent are not desired since the epichlorohydrin may tend to react with the glycerin in a manner analogous to the reaction of the alcohols with the epichlorohydrin. The preferred concentration of glycerin is between 20 and 500 parts per million of the reaction mixture.

The glycerin is preferably added initially to the reaction mixture but can suitably be added at any time prior to removal of the water-epichlorohydrin azeotrope.

The invention will be further described with reference to the following experimental work. In all of the examples methacrylic acid (0.5 mole) was the unsaturated fatty acid employed and aqueous potassium hydroxide (5 grams of KOH in 3 milliliters of water) was the alkali metal hydroxide employed. The molar ratio of potassium hydroxide to methacrylic acid was substantially 1:1 in all examples. The molar ratio of epichlorohydrin (the solvent used in all examples) to the methacrylic acid was about 15:1 in all examples. The reaction procedure was to admix the methacrylic acid and epichlorohydrin in a reaction vessel equipped with a stirrer, distillation column and thermometer. The potassium hydroxide solution was added dropwise over the course of the reaction, which was about 15 minutes. The reaction temperature in all examples was room temperature (about 25° C.) and atmospheric pressure was employed. After a reaction time of 5 minutes the water was removed from the reaction zone by increasing the temperature to 96° C.–117° C. where a water-epichlorohydrin azeotrope was removed overhead.

When the above procedure was followed, severe foaming was encountered, especially when the temperature was increased in preparation for removal of a water-epichlorohydrin azeotrope. As a result of the foaming it was difficult to remove the water from the reaction zone.

Example 1

Two drops (0.0968 gram) of glycerin was added to the epichlorohydrin-methacrylic acid reaction mixture before the addition of the potassium hydroxide solution. No foaming was observed during the removal of the water-epichlorohydrin azeotrope by distillation.

Example 2

Example 1 was repeated using only one drop of glycerin (0.0484 gram) and results similar to those in Example 1 were obtained.

Example 3

Example 1 was repeated except one drop of ethylene glycol was employed in place of the glycerin. Extensive foaming was observed.

Example 4

Example 1 was repeated except two drops of propylene glycol were employed in place of glycerin. Extensive foaming was observed.

Extensive foaming was also observed when 0.0631 gram of a polyvinyl alcohol, two drops of methanol, or two drops of ethylene glycol-monomethylether was employed in place of the glycerin. Foaming was also not reduced when commercial antifoam agents, the exact nature of which are unknown, were employed in place of the glycerin.

The above results show the unexpected nature of the effect of glycerin on the reduction of foaming when employed in a reaction mixture comprising water, epichlorohydrin and an alkali metal salt of an unsaturated fatty acid.

Resort may be had to such variations and modifications as fall within the spirit of the invention and the scope of the appended claims.

We claim:

1. In a process for the removal of water by azeotropic distillation from a mixture of water, epichlorohydrin and an alkali metal salt of an unsaturated fatty acid having between 3 and 20 carbon atoms, the improvement which comprises adding to said mixture an amount of glycerin sufficient to inhibit foaming during distillation.

2. In a process for the preparation of an anhydrous slurry of an alkali metal salt of an unsaturated fatty acid having between 3 and 20 carbon atoms and epichlorohydrin wherein at least one of said fatty acids is contacted in a reaction zone with an aqueous solution of an alkali metal hydroxide to produce said alkali metal salt and water; and wherein water is removed from said reaction zone as a water-epichlorohydrin azeotrope, and wherein sufficient epichlorohydrin is employed to remove said water as a water-epichlorohydrin azeotrope and to maintain said alkali metal salt in suspension, the improvement which comprises adding to said reaction zone an amount of glycerin sufficient to inhibit foaming in said reaction zone during removal of the water-epichlorohydrin azeotrope.

3. A process according to claim 2, wherein the unsaturated fatty acid has the formula

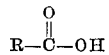

where R is an unsaturated unsubstituted alkyl radical having from 2 to 19 carbon atoms and the alkali metal hydroxide has the formula MOH, where M represents any alkali metal selected from the group consisting of sodium, potassium, lithium and cesium.

4. A process according to claim 3 wherein the fatty acid is methacrylic acid.

5. A process according to claim 3 wherein the alkali metal hydroxide is an aqueous solution of sodium hydroxide or potassium hydroxide.

6. A process according to claim 2, wherein the reaction temperature is less than 40° C.

7. A process according to claim 1, wherein the amount of glycerin added is between 10 parts per million of the reaction mixture and one weight percent of the reaction mixture.

8. A process according to claim 2, wherein a water-epichlorohydrin azeotrope is continuously removed during the reaction.

9. A process according to claim 6, wherein the fatty acid is methacrylic acid and the alkali metal hydroxide is potassium hydroxide.

References Cited

UNITED STATES PATENTS

| | | |
|---|---|---|
| 2,537,981 | 1/1951 | Edwards. |
| 2,921,049 | 1/1960 | Moroson _____ 203—58 |
| 3,027,307 | 3/1962 | Stoffer et al. _____ 203—20 |
| 3,053,855 | 9/1962 | Maerker et al. ____ 260—348.6 |
| 3,154,577 | 10/1964 | Carter et al. _____ 252—321 |
| 3,178,454 | 4/1965 | Kloos et al. _____ 260—348.6 |
| 3,317,435 | 5/1967 | Yamashita et al. _____ 252—321 |

WILBUR L. BASCOMB, Primary Examiner

U.S. Cl. X.R.

203—14, 20, 58; 252—321; 260—413, 486